United States Patent [19]
Steger

[11] 3,932,201
[45] Jan. 13, 1976

[54] MAGNESIUM OXIDE COATING COMPOSITION AND PROCESS

[75] Inventor: John F. Steger, Crystal Lake, Ill.

[73] Assignee: Morton-Norwich Products, Inc., Chicago, Ill.

[22] Filed: Feb. 24, 1975

[21] Appl. No.: 552,041

[52] U.S. Cl. .................. 148/27; 148/31.5; 148/113; 148/122; 148/13.1; 427/126; 427/127
[51] Int. Cl.² .......................................... B23K 35/24
[58] Field of Search ............ 148/27, 31.5, 113, 122, 148/13.1; 427/126, 127; 428/432

[56] References Cited

UNITED STATES PATENTS

| | | | |
|---|---|---|---|
| 2,354,123 | 7/1944 | Horstman et al. | 148/27 |
| 3,627,594 | 12/1971 | Yamamoto et al. | 148/113 |
| 3,697,322 | 10/1972 | Lee et al. | 427/127 |

*Primary Examiner*—Walter R. Satterfield
*Attorney, Agent, or Firm*—Jack Axelrood

[57] ABSTRACT

Magnesium oxide coating compositions, process for their preparation and process for applying said compositions as adherent dried coatings which when annealed form relatively non-porous insulations providing improved electrical insulating properties. The coating compositions comprise a major proportion of magnesium oxide and a minor proportion of zinc permanganate and magnesium sulfate, wherein the concentration of zinc permanganate is from about 4 to about 16 parts per 100 parts of magnesium oxide and the concentration of magnesium sulfate is at least about 50 parts per 100 parts of zinc permanganate.

9 Claims, No Drawings

MAGNESIUM OXIDE COATING COMPOSITION AND PROCESS

BACKGROUND OF THE INVENTION

1. Field of the Invention

As described in U.S. Pat. Nos. 3,583,887 and 3,841,925, silicon-containing steel sheet is prepared by cold-rolling silicon-containing steel into sheet form, coiling the steel sheet into rolls and thereafter annealing the coiled sheet by a controlled heating process to produce a grain oriented steel having desirable magnetic properties.

Magnesium oxide is used extensively as a highly heat resistant separator medium and protective coating for metal surfaces. It is also used as an electrical insulator coating for metals, as a "gatherer" for removing impurities, such as sulfur and carbon, from thin metal sheets and particularly as a protective coating for silicon steel. The electrical insulating coating is understood to be derived from coating magnesium oxide on steel, which then forms a film or coating containing $Mg_2SiO_4$ which coating is an effective electrical insulator when annealed.

2. Description of the Prior Art

Referring again to U.S. Pat. Nos. 3,583,887 and 3,841,925, according to the present industrial practice, silicon-containing steel is cold rolled into sheets, decarburized and thereafter coiled into convenient rolls. Cold rolling develops in the steel the potential to form a grain oriented structure when the steel is later "annealed." The term annealed refers to a process whereby the steel is heated to about 1200°C. in an atmosphere of low dewpoint containing hydrogen, or in a vacuum, under programmed conditions with respect to time and temperature. This results in a growth in size of the steel grains and also in a specific grain orientation which provides the desired soft magnetic properties sought. During the annealing process, virtually all of the remaining excess carbon and sulfur content of the steel is lost.

During the annealing process in hydrogen where the steel is in large coils, in the absence of a suitable separating medium, the coiled roll would fuse to itself and could not be unrolled. Conventionally, this is avoided by placing a thin coating of magnesium oxide on the steel prior to coiling. Further, the magnesium oxide coating serves to reduce impurities such as carbon and sulfur in steel by chemical reaction. In addition, magnesium oxide provides a major part of an electrically insulating silicate layer by reaction with the steel. For most applications, this silicate insulation is important to form an efficient electrical insulating coating or as the base coating upon which such insulation is formed. Thus, for example, transformer cores are constructed from thin sheets of soft magnetic steel stacked together to form a laminated body in which each sheet is electrically insulated from its neighbor. This construction vastly reduces the generation of eddy currents in the core imposed by an alternating electrical field. The average density of soft iron in the core should be as large as possible and consequently the insulation on the plates should be as thin as possible to provide closer stacking of steel plates.

Obviously, short circuits between plates reduces transformer efficiency and often causes the development of damaging hot spots in the transformer core. Consequently, soft magnetic steel is rated by the number of short circuits per unit area, usually expressed in terms of the electrical resistance of the insulating layer. This is a standard ASTM measurement known as the Franklin Test and is a measure of the conductance.

Generally, it is known that two types of oxidizing agents added to MgO aid in forming high quality MgO insulation on silicon steel, i.e., high and low temperature oxidizers. High temperature oxidation supplies oxygen to reactions that can be summarized as:

$$O_2 + Si + 2\,MgO \xrightarrow{High\ temp.} Mg_2SiO_4 \qquad (1)$$

Low temperature oxidation is for reactions of the following form:

$$3\,Fe + 2\,O_2 \xrightarrow{Lower\ temp.} Fe_3O_4 \qquad (2)$$

It appears that $Fe_3O_4$ and associated iron silicates serve as a bonding layer on steel surfaces which holds the $Mg_2SiO_4$ insulating layer to the steel. The iron oxide might also supply some of the oxygen for reaction (1).

By high temperatures is meant those temperatures reached when $Mg_2SiO_4$ forms from MgO and silicon steel during hydrogen annealing. By lower temperatures is meant temperatures at and below those reached on the steel when drying wet coatings.

Reaction (2) commonly occurs by reaction of steam and iron, i.e., $$4\,H_2O + 3\,Fe \xrightarrow{\Delta} Fe_3O_4 + H_2\uparrow \qquad (3)$$

and somewhat by $$2\,O_2 + 3\,Fe \xrightarrow{\Delta} Fe_3O_4 \qquad (4)$$

These reactions occur in the last stages of decarburizing the steel and more commonly when heat drying wet coatings on the steel. In either case the oxide layer is visible in the form of a temper color of the immediate steel surface if the layer is thick enough to cause light diffraction.

Reactions of the type described in equation (1) have been taught for many years and many high temperature oxidizing agents are known. Among these are manganese, zinc, silicon, and chromium oxides. Manganese is particularly preferred since it can preferentially oxidize silicon and not iron when present in the reduced state. As with low temperature oxidizers, problems are encountered when attempting to coat and distribute high temperature oxidizers in the coatings. Hence, appreciable quantities of manganese, zinc, or silicon oxides cannot be introduced without destroying the needed rheological properties of the coating slurry.

The patent literature teaches the following regarding the addition of Zn and Mn to MgO:

1. Manganese oxides used in conjunction with $Al_2O_3$ aid in forming a uniform glass (see U.S. Pat. Nos. 3,627,594 and 3,522,108).
2. MnO plus MgO is used to improve the adhesion of the base insulation to the steel. Zn, Cu, or Cr oxides can also be substituted for Mn (see U.S. Pat. No. 3,522,108).
3. MnO can selectively oxidize Si at 800°C. without oxidizing Fe during hydrogen annealing because of the free energy relationship that exists. MnO differs from $Cr_2O_3$ in that it is entirely assimilated by the MgO and the steel. However MnO is not commercially available and must be prepared by reduction of $MnO_2$ (see Ger. Pat. Nos. 2,033,650 and 2,062,290). ZnO was also advocated for making insulation coatings in U.S. Pat. Nos. 3,364,057 and 3,271,718. MgO plus reduced manganese oxide can tolerate up to 3% $MnO_2$ or 25% $Mn_3O_4$. The MgO can be dead burned.

It is also known that $MnO_2$ admixed with MgO produces poorly adhering coatings and that $MnO_2$ tends to separate out of suspension.

It has been discovered that the condition of the $Fe_3O_4$ on the steel affects the quality of the insulation eventually formed after annealing. Apparently an optimum thickness of a highly uniform layer is required after drying coatings and before annealing. The source of oxygen for reactions of the type (3) and (4) and the rate at which reaction occurs can apparently determine what type of oxide layer forms. I have accordingly discovered that certain well known oxidizing agents when incorporated with magnesia in aqueous coating slurries will provide the type of oxide layers sought. However, because of rheological alterations that occur when such agents are added to magnesia slurries the choice is limited and none have been found that will perform properly without incorporating a second additive which modifies the coating behavior.

It has been discovered that the elements represented in the oxides of zinc and manganese can be introduced as a single chemical compound as zinc permanganate. I have further discovered that by introducing this water soluble compound in combination with a sulfate promoter that I can improve both forms of oxidative functions described by equations (1) and (2) and at the same time coat the steel successfully.

It has also been discovered that when said additives in combination with magnesia are coated on high permeability steels which contain aluminum we obtain superb insulation. X-ray studies revealed that the zinc can combine with aluminum and oxygen to provide zinc aluminate which in combination with the magnesium silicate formed provides good insulation.

Zinc permanganate admixed with magnesia and water tends to hydrolize forming zinc and manganese hydroxides. This formation tends to destroy the rheology of the coating suspension and defeats the object of introducing a water soluble additive. Accordingly, I found that the hydrolysis could be suppressed by adding a water soluble alkali earth metal sulfate. $MgSO_4$ is preferable since it does not introduce new elemental species into the formula.

Accordingly, it would be desirable to provide magnesium oxide coating compositions which have high and low temperature oxidizing properties and which when coated onto silicon steel and thereafter annealed produce a high quality electrical insulation.

It is therefore an object of the present invention to provide magnesium oxide silicon-steel coating compositions which have high and low temperature oxidizing properties and which provide high quality electrical insulation when coated onto steel and thereafter annealed. It is another object to provide said coating compositions in a form which exhibit good rheological properties when formed into an aqueous slurry for use in a steel coating operation.

SUMMARY OF THE INVENTION

Broadly, the foregoing objects are achieved by the provision of magnesium oxide coating compositions comprising a major proportion of magnesium oxide and a minor proportion of zinc permanganate and magnesium sulfate, wherein the concentration of zinc permanganate is from about 4 to about 16 parts per 100 parts of magnesium oxide and the concentration of magnesium sulfate is at least about 50 parts per 100 parts of zinc permanganate.

This invention also provides a process for preparing said magnesium oxide coating compositions, said process comprising admixing magnesium oxide with zinc permanganate and magnesium sulfate, the concentration of zinc permanganate being from about 4 to about 16 parts per 100 parts of magnesium oxide and the concentration of magnesium sulfate being at least about 50 parts per 100 parts of zinc permanganate.

This invention also provides a process for coating silicon-containing steel sheet with an electrically insulating coating, which process comprises in sequence forming an aqueous slurry of a magnesium oxide composition as defined above, coating said slurry onto the surfaces of steel sheet, heating the coated steel sheet to dry said coating thereon and thereafter annealing said dried coated steel at a temperature in excess of about 1000°C The magnesium oxide useful in this invention includes any magnesia which readily forms an aqueous slurry suitable for coating onto steel and which does not have an excessive reducing action toward potassium permanganate as defined by the following test:

REDUCING ACTION TEST FOR MAGNESIUM OXIDE

Six grams of the candidate magnesium oxide are shaken with 100 milliliters of water containing 3 ml. of 0.01 normal potassium permanganate. The mixture is allowed to settle and the supernatant liquid is decanted into a suitable elongated cylindrical colorimeter tube. The color of the supernatant liquid is compared with the pink color obtained by the use of a standard magnesia, one commercially available under the designation "Magnesium Oxide 57B," carried through the same procedure. The candidate magnesia is operable in the present invention if no more than 3 ml. of 0.01 normal $KMnO_4$ are required to match the pink color of the standard magnesia.

For coating steel, an aqueous suspension (or slurry) of the above described magnesium oxide coating composition is prepared by mixing with water until the desired rheological properties are obtained. Generally from about 5 to about 20 weight percent of the magnesium oxide composition, based on water, is satisfactory to provide an aqueous slurry having the requisite viscosity and flow properties suitable for coating onto steel sheet.

In any steel-coating operation employing an aqueous slurry of a magnesium oxide composition, the rheology of the slurry is an important factor in the operability of the coating operation itself and in the adequacy of the actual coating obtained. That is, the magnesia slurry should develop an optimum level of viscosity so that the coating lies smoothly on the surface of the steel and does not run or coagulate. The slurry must remain uniform throughout its entire volume or else after coating there will be bare spots on some portions of the steel and excessive coating on other parts.

The present magnesium oxide coating compositions are operable on a wide variety of commercially available steels ranging from those having to a low permeability. Permeability is a measure of the ability of a core material to be magnetized, or the ease with which the magnetizing force can induce a flux density in a magnetic circuit, and is numerically equal to the magnetizing force divided by the flux density.

DESCRIPTION OF THE PREFERRED EMBODIMENTS

In one preferred form, the steel coating magnesium oxide compositions of the present invention comprise a major proportion of magnesium oxide and a minor proportion of zinc permanganate and magnesium sulfate in which the concentration of zinc permanganate is from about 10 about 15 parts per 100 parts of MgO and the concentration of magnesium sulfate is from about 50 to about 55 parts per 100 parts of zinc permanganate.

Aqueous slurries suitable for steel coating operations are prepared from said compositions by adding from about 8 to about 15 weight percent of the composition to water to form a homogenous suspension thereof having the requisite rheological properties for coating onto steel surfaces.

As more fully elaborated in the Examples, it was found that a combination of zinc permanganate and magnesium sulfate is required to achieve the desired results of this invention. For a more complete understanding of the present invention, reference is now made to the following specific examples illustrating the improved properties of the coating compositions of this invention.

DESCRIPTION OF TESTS

CONDUCTANCE (Franklin Test)

This test is widely accepted and utilized for evaluating the conductance of coated steel sheets. A detailed description is found in ASTM Method A-334-52, "Standard Methods of Test for Electrical and Mechanical Properties of Magnetic Materials." Briefly, the test is carried out by passing an electric current through brass contacts which cover coated areas 0.1 square inch in area. Current passing through the coating flows through the steel to a contact made directly to the steel by means of a twist drill. The resulting amperage provides a measure of the resistance encountered through the coating. Several hundred contacts are employed in obtaining readings for coating evaluation. A complete short circuit, i.e., complete Conductance, is indicated by a reading of 100 milliamps per 0.1 square inch. Therefore, the lower the reading in milliamps the more insulating the coating. As presented herein, the Franklin values are relative values in that they represent the number obtained by dividing the Franklin value of the test specimen by the Franklin value of the control and multiplying by 100.

POROSITY (Copper Plating Test)

A steel sheet bearing a dried and annealed coating is immersed in an aqueous solution of copper sulfate. Copper spontaneously plates on the surfaces that are not electrically insulated, and therefore provides an indication of the Porosity of the annealed coating.

I. The Reagent 80 g. $CuSO_4.5H_2O$/liter $H_2O$

II. Procedure

A. Fill a 200 ml. tall form beaker with about 100 ml. of copper sulfate solution.

B. With the solution at about 80°F. partially immerse the sample of coated and annealed steel for 30 seconds moving the sample with a fanning motion.

C. After 30 seconds, wash off adhering reagent by holding the strip under a stream of tap water.

D. Wipe the strip and allow it to dry.

E. The reagent can be reused a number of times without grossly affecting the results. It should be discarded when it visually appears to contain too much iron sulfate.

III. Interpretation of Results

Copper will plate on many types of defects that are not directly produced as a result of the magnesia or the steel quality. Hence, edge effects from annealing small strips, accidental mechanical or surface marking are discounted for such purposes. Evaluations of magnesia, steel, and processing quality are accordingly based on the appearance of overall centrally located areas. The extent of plating can vary from complete to no plating at all.

The results are characterized as follows:

| Result | Porosity |
|---|---|
| Completely free of copper plating | Good |
| Traces of partially copper plated | Fair |
| Completely copper plated | Bad |

EXAMPLE 1

A steel coating slurry or suspension was prepared by dissolving 15 grams of magnesium oxide in 180 ml. of water. This slurry was maintained at a temperature of about 110°F. for 20 to 40 minutes and coated onto silicon steel sheets or plates, each plate measuring 3.0 × 15.3 cm. by 12–14 mils. in thickness. Two conditions of steel surface oxidation were represented, i.e., steel as received in the lowest available oxidation condition, and steel which was heated and the surface of which was oxidized to a blue temper color. Each form of surface oxidized steel was utilized and compared in succeeding examples. The coatings were leveled and then air-dried to a steel temperature of about 205°C. reached in about 15 seconds, to provide a dried coating weight of from about 0.02 to about 0.05 ounces per square foot of steel, the usual coating weight employed in the steel industry. The rheology of the slurry and its usefulness as a coating vehicle were observed.

The dried coated steel sheets were annealed by heating at 1177°C. for a fixed time interval. The annealed sheets were then cooled, and excess or loose magnesium oxide was scrubbed from the surface of each coated sheet by brushing in a stream of flowing water.

The Conductance of the coated and annealed surface was measured by means of the Franklin Test, and the Porosity of the surface was determined by means of the Copper Plating Test.

EXAMPLE 2

The procedure of Example 1 was repeated except that 0.3 gram of zinc permanganate (2 parts per 100 parts MgO) was added to the water.

EXAMPLE 3

The procedure of Example 1 was repeated except that 0.6 gram of zinc permanganate (4 parts per 100 parts MgO) was added to the water.

EXAMPLE 4

The procedure of Example 1 was repeated except that 1.2 grams of zinc permanganate (8 parts per 100 parts MgO) were added to the water.

EXAMPLE 5

The procedure of Example 1 was repeated except that 2.4 grams of zinc permanganate (16 parts per 100 parts MgO) were added to the water.

The results are summarized in Table I as follows:

TABLE I

| Example | Relative Franklin Test Value[A.] | Franklin Test Improvement | Porosity | Rheology of Aq. Slurry[B.] |
|---|---|---|---|---|
| 1 (Control) | 100 | | Fair-Good | Poor |
| 2 | 66 | 34%[C.] | Poor | Poor |
| 3 | 74 | 26% | Fair | Poor |
| 4 | 49 | 51% | Good | Poor |
| 5 | 46 | 54% | Excellent | Poor |

[A.] - Used steel in the non-blued condition before coating.
[B.] - Relates to uniformity and viscosity of the aqueous slurry.
[C.] - $\frac{(100-66)}{100} \times 100$ The foregoing results demonstrate that the addition of zinc permanganate to magnesium oxide causes an improvement in insulation as measured by the Franklin Test and by the Porosity. However, the rheology of the aqueous slurry coating solution is poor due to formation of the hydroxides of zinc and manganese causing great difficulty in providing evenly coated steel sheets in a coating operation.

EXAMPLE 6

The procedure of Example 1 was repeated except that 1.16 grams of magnesium sulfate were added in addition to the 15.0 grams of magnesium oxide.

EXAMPLE 7

The procedure of Example 1 was repeated except that 2.14 grams of zinc permanganate (14.3 parts per 100 parts MgO) and 1.16 grams of magnesium sulfate (54.2 parts per 100 parts zinc permanganate) were added in addition to the 15.0 grams of magnesium oxide.

EXAMPLE 8

The procedure of Example 1 was repeated except that 2.14 grams of zinc permanganate and 0.96 gram of magnesium sulfate (44.9 parts per 100 parts zinc permanganate) were added in addition to the 15.0 grams of magnesium oxide.

EXAMPLE 9

The procedure of Example 1 was repeated except that 1.5 grams of zinc permanganate (10.0 parts per 100 parts MgO) were added in addition to the 15.0 grams of MgO.

EXAMPLE 10

The procedure of Example 1 was repeated except that 1.5 grams of zinc permanganate (10.0 parts per 100 parts MgO) and 0.83 gram of magnesium sulfate (55.4 parts per 100 parts zinc permanganate) were added in addition to the 15.0 grams of magnesium oxide.

EXAMPLE 11

The procedure of Example 1 was repeated except that 0.6 gram of zinc permanganate (4 parts per 100 parts MgO) and 0.9 gram of magnesium sulfate (54 parts per 100 parts zinc permanganate) were added in addition to the 15.0 grams of magnesium oxide.

In each of Examples 6–11, the dried coating was observed for appearance and adherence. The steel employed for Examples 6–11 was from a different batch from that used for Examples 1–5.

The results of Experiments 6–11 are set forth in Table II.

TABLE II

| Example | Appearance | Adherence | INSULATION Relative Franklin Test vs. "As is" Steel as Control | vs. "Blued" Steel as Control | Porosity |
|---|---|---|---|---|---|
| 6 | Good | Good | 100 | 100 | Poor |
| 7 | Good | Good–Excellent | 99 | 74 | Fair to Excellent |
| 8 | BADLY MOTTLED — COULD NOT COAT | | | | |
| 9 | BADLY MOTTLED | | 75 | 55 | Poor |
| 10 | Fair | Good–Excellent | 97 | 71 | Fair |
| 11 | Good | Fair–Good | 92 | 82 | Fair |

Note that Franklin values in the Examples are relative values, i.e., they represent the value obtained by dividing the Franklin value of the test-specimen by the Franklin value of the standard control and multiplying by 100. The control is therefore arbitrarily set at 100. Such comparisons are always made on steel from a single batch.

The conclusions to be drawn from Examples 6–11 may be summarized as follows:

1. The addition of magnesium sulfate alone to magnesium oxide results in a coating which has a poor Conductance, i.e., Insulation (Franklin value), and also poor Porosity (Example 6).
2. The addition of zinc permanganate alone to magnesium oxide resulted in a coating which is not acceptable (badly mottled — Example 9).
3. The combination of zinc permanganate *and* magnesium sulfate (in the proper proportions) is required to provide acceptable coatings, insulation (i.e., Franklin values) and Porosity.

These conclusions are borne out by noting that Examples 7, 10 and 11 all display good appearance, adherence, improved Franklin values and fair to excellent Porosity, and that these Examples contain the combination of zinc permanganate and magnesium sulfate within the concentrations of this invention, i.e., from about 4 to about 16 parts per hundred of zinc permanganate per 100 parts of magnesium oxide and at least about 50 parts per hundred of magnesium sulfate per 100 parts of zinc permanganate.

The composition of Example 8 which provided a combination of zinc permanganate and magnesium sulfate in which the magnesium sulfate was only 44.9 parts per 100 parts of zinc permanganate could not be coated onto the steel. Example 9, where magnesium sulfate was absent, exhibited a badly mottled appearance and a poor Porosity.

It is also noted that, in general, when the compositions of this invention, as exemplified by Examples 7, 10 and 11, are applied to "blued" steel, the Franklin values show a greater degree of improvement over the Control than in the instance when the compositions are applied to "as is" steel. Steel of commerce is provided with a variety of surface oxidation states. That is, steel may have a silver-like surface which indicates virtually no oxidation, or it may have a light tan colored surface which indicates a relatively moderate surface oxidation state. Whatever the surface oxidation state encountered, the compositions of this invention provide improved insulation (i.e., Franklin values) and Porosity over the non-coated steel. The "as is" steel used in the preceding examples varied in color from silver to tan.

EXAMPLES 6A–11A

Examples 6–11 were repeated and designated Examples 6A, 7A, 8A, 9A, 10A and 11A respectively, with the exception that the composition of Examples 6A (Control) was the same as that of Example 1 and contained no magnesium sulfate. The respective compositions were coated on the same batch of steel as was used for Examples 6–11. The results are tabulated in Table III.

TABLE III

| Example | Appearance | Adherence | INSULATION Relative Franklin Test vs. "As is" Steel as Control | vs "Blued" Steel as Control | Porosity |
|---|---|---|---|---|---|
| 6A | Good | Good | 100 | 100 | Poor |
| 7A | Good | Good–Excellent | 86 | 74 | Fair to Excellent |
| 8A | COULD NOT COAT | | | | |
| 9A | BADLY MOTTLED | | 64 | 55 | Poor |
| 10A | Fair | Good–Excellent | 82 | 70 | Fair |
| 11A | Good | Fair–Good | 134 | 115 | Fair |

The results of Experiments 6A–11A corroborate those of 6–11 in that the compositions of Examples 7A, 10A and 11A display the same good qualities as those of Examples 7, 10 and 11. The differences in the Franklin values of Examples 7A, 10A and 11A when compared with those of Examples 7, 10 and 11 are explained by the fact that the Control (Example 6A) was different from that of the Control of Example 6.

EXAMPLE 12

Coated non-blued steel sheets weighing 105 g. and having an area of 840 cm² were prepared according to the procedure of Example 1. The sheets were dried in air at 1150°F. for 15 seconds.

The steel sheets were weighed (prior to coating), coated and then weighed after removing the dried coating to determine the weight gain of the steel itself due to reaction with oxygen and steam (derived from the residual water in the dried coating).

In addition, the actual coating weight itself was determined. The results were as follows:

| | Coating Wt. | Wt. Gain (or Loss) |
|---|---|---|
| Example 12 | $9.2 \times 10^{-4}$ g./cm² | −.0002 g/840 cm² of steel (Loss) |

EXAMPLE 13

The procedure of Example 12 was repeated except that the coating composition employed was that of Example 7 and contained the following:

| | | |
|---|---|---|
| MgO | 15.0 grams | |
| Zinc Permanganate | 2.14 grams | (14.3 parts per 100 parts MgO) |
| Magnesium Sulfate | 1.16 grams | (54.2 parts per 100 parts zinc permanganate) |

The results were as follows:

| | Coating Wt. | Wt. Gain |
|---|---|---|
| Example 13 | $23.6 \times 10^{-4}$ g./cm² | +0.0004 |

Comparing this weight gain with that of the weight loss of Example 12, it is seen that the presence of zinc permanganate and $MgSO_4$ provided an enhanced oxidized steel surface over that obtained by MgO alone.

EXAMPLE 14

The procedure of Example 12 was repeated. The results were as follows:

| | Coating Wt. | Wt. Gain |
|---|---|---|
| Example 14 | $8.4 \times 10^{-4}$ g./cm² | +0.0096 |

EXAMPLE 15

The procedure of Example 13 was repeated, with the following results:

| | Coating Wt. | Wt. Gain |
|---|---|---|
| Example 15 | $19.8 \times 10^{-4}$ g./cm² | +0.0109 |

Comparing the weight gain of Example 15 with that of Example 14, we find the following:

| | Wt. Gain | Increased Oxidation Due to Zinc Permanganate and $MgSO_4$ |
|---|---|---|
| Example 14 | 0.0096 | |
| Example 15 | 0.0109 | 13%* |

$$* \ \frac{(0.0109 - 0.0096)}{0.0096} \times 100$$

EXAMPLE 16

The procedure of Example 12 was repeated with the following results:

| | Coating Wt. | Weight Gain |
|---|---|---|
| Example 16 | 23.4 × $10^{-4}$ g./cm$^2$ | +0.0070 |

EXAMPLE 17

The procedure of Example 13 was repeated, with the following results:

| | Coating Wt. | Weight Gain |
|---|---|---|
| Example 17 | 19.8 × $10^{-4}$ g./cm$^2$ | +0.0109 |

Comparing the weight gain of Example 17 with that of Example 16, we find the following:

| | Wt. Gain | Increased Oxidation Due to Zinc Permanganate and $MgSO_4$ |
|---|---|---|
| Example 16 | +0.0070 | |
| Example 17 | +0.0109 | 56%* |

$$* \frac{(0.0109-0.0070)}{0.0070} \times 100$$

The foregoing Examples 12–17 demonstrate that the compositions of the present invention provide a steel surface having enhanced oxidation when compared with steel coated with MgO alone.

EXAMPLE 18

The procedure of Example 7 was repeated except that the steel employed was a commercial product having a magnetic permeability ranging from 1900–1975. The results were as follows:

| Dried Coating Appearance | Dried Coating Adherence | INSULATION Relative Franklin Test "As is" Steel | INSULATION Relative Franklin Test "Blued" Steel | Porosity |
|---|---|---|---|---|
| Good | Good-Excellent | 86 | 74 | Excellent |

EXAMPLE 19

The procedure of Example 18 was repeated. The steel employed was a commercial product having a magnetic permeability of 1900–1974, except that the steel was from a different supplier than the steel of Example 18. The results were as follows:

| Dried Coating Appearance | Dried Coating Adherence | INSULATION Relative Franklin Test "As is" Steel | INSULATION Relative Franklin Test "Blued" Steel | Porosity |
|---|---|---|---|---|
| Good | Good | 51 | 51 | Fair-Good |

EXAMPLE 20

The procedure of Example 18 was repeated, except that the steel employed was one having a permeability ranging from about 1800 to about 1875. The results were as follows:

| Dried Coating Appearance | Dried Coating Adherence | INSULATION Relative Franklin Test "As is" Steel | INSULATION Relative Franklin Test "Blued" Steel | Porosity |
|---|---|---|---|---|
| Good | Good-Excellent | 96 | 89 | Excellent |

EXAMPLE 21

The procedure of Example 20 was repeated, except that the steel employed was from a different source than that of Example 20. The results were as follows:

| Dried Coating Appearance | Dried Coating Adherence | INSULATION Relative Franklin Test* "As is" Steel | INSULATION Relative Franklin Test* "Blued" Steel | Porosity |
|---|---|---|---|---|
| Good | Fair | 42 | 49 | Good |

*No magnesium sulfate in Control coatings.

The results of Examples 18–21 demonstrate that the present coating composition is useful on a wide variety of commercially available steels, ranging from a high permeability (1900–1975) steel-containing aluminum known as "HI-PERM" steel to a regular type grain oriented steel having a permeability of 1800–1875.

I claim:

1. A magnesium oxide composition for coating onto silicon-containing steel sheet, said composition comprising a major proportion of magnesium oxide and a minor proportion of zinc permanganate and magnesium sulfate, wherein the concentration of zinc permanganate is from about 4 to about 16 parts per 100 parts of magnesium oxide and the concentration of magnesium sulfate is at least about 50 parts per 100 parts of zinc permanganate.

2. The composition of claim 1 wherein the zinc permanganate is present in an amount of from about 10 to about 15 parts per hundred of magnesium oxide.

3. The composition of claim 1 wherein the zinc permanganate is present in an amount of from about 10 to about 15 parts per 100 parts of magnesium oxide and the magnesium sulfate is present in an amount of about 50–55 parts per 100 parts of zinc permanganate.

4. A process for preparing a magnesium oxide composition for coating silicon-containing steel sheet, said process comprising admixing a major proportion of magnesium oxide with a minor proportion of zinc permanganate and magnesium sulfate, the concentration of zinc permanganate being from about 4 to about 16 parts per 100 parts of magnesium oxide and the concentration of magnesium sulfate being at least about 50 parts per 100 parts of zinc permanganate.

5. The process of claim 4 wherein the concentration of zinc permanganate is from about 10 to about 15 parts per 100 parts of magnesium oxide.

6. The process of claim 4 wherein the concentration of zinc permanganate is from about 10 to about 15 parts per 100 parts of magnesium oxide and the concentration of magnesium sulfate is from about 50 to about 55 parts per 100 parts of zinc permanganate.

7. A process for coating silicon-containing steel sheet with an electrically insulating coating, which process comprises in sequence forming an aqueous slurry of a magnesium oxide composition as defined in claim 1, coating said slurry onto the surfaces of steel sheet, heating the coated steel sheet to dry said coating thereon and thereafter annealing said dried coated steel at a temperature in excess of about 1000°C.

8. A process according to claim 5 wherein the slurry has a solids content from about 5 to about 20 percent by weight.

9. A coated silicon-steel sheet having thereon an adhered coating of the composition defined in claim 1.

* * * * *